US006501833B2

(12) United States Patent
Phillips et al.

(10) Patent No.: US 6,501,833 B2
(45) Date of Patent: Dec. 31, 2002

(54) METHOD AND APPARATUS FOR DYNAMIC ADAPTATION OF A LARGE VOCABULARY SPEECH RECOGNITION SYSTEM AND FOR USE OF CONSTRAINTS FROM A DATABASE IN A LARGE VOCABULARY SPEECH RECOGNITION SYSTEM

(75) Inventors: Michael S. Phillips, Belmont, MA (US); John N. Nguyen, Belmont, MA (US)

(73) Assignee: SpeechWorks International, Inc., Boston, MA (US)

( * ) Notice: Subject to any disclaimer, the term of this patent is extended or adjusted under 35 U.S.C. 154(b) by 0 days.

(21) Appl. No.: 08/943,557

(22) Filed: Oct. 3, 1997

(65) Prior Publication Data

US 2002/0048350 A1 Apr. 25, 2002

Related U.S. Application Data

(63) Continuation of application No. 08/451,448, filed on May 26, 1995, now abandoned.

(51) Int. Cl.$^7$ .............................. H04M 1/64; H04M 3/42
(52) U.S. Cl. ................................ 379/88.07; 379/88.01; 379/67.1; 379/88.08; 379/88.13; 379/218.01; 379/93.12; 379/88.21
(58) Field of Search ................................ 704/244, 252, 704/253, 254, 255, 256, 257, 1, 231, 235, 243, 260, 240; 379/88.01, 88.02, 88.03, 88.04, 88.05, 88.07, 67.1, 88.08, 88.13, 218.01, 91.01, 93.03

(56) References Cited

U.S. PATENT DOCUMENTS 4,156,868 A * 5/1979 Levinson ................. 340/146.3
4,481,593 A * 11/1984 Bahler ..................... 364/513.5
4,489,434 A * 12/1984 Moshier .................... 381/43

(List continued on next page.)

FOREIGN PATENT DOCUMENTS

WO    WO 94/16434    * 7/1994

OTHER PUBLICATIONS

Kenny, P., Hollan, R., Gutpa, V., Lennig, M., Mermelstein, P., and O'Shaughnessy, D., "A* Admissible Heuristics for Rapid Lexical Access," *ICASSP91* Toronto, Ontario, Canada, May 14–17, 1991.

Gutpa, V.N., Lennig, M., Mermelstein, P., Kenny, P., Seitz, F., and O'Shaughnessy, D., "Using Phoneme Duration and Energy Contour Information to Improve Large Vocabulary Isolated–Word Recognition," *ICASSP91* Toronto, Ontario, Canada, May 14–17, 1991.

(List continued on next page.)

*Primary Examiner*—Allan Hoosain
(74) *Attorney, Agent, or Firm*—Hale and Dorr LLP (57) ABSTRACT

The lexical network of a large-vocabulary speech recognition system is structured to effectuate the rapid and efficient addition of words to the system's active vocabulary. The lexical network is structured to include Phonetic Constraint Nodes, which organize the inter-word phonetic information in the network, and Word Class Nodes which organize the syntactic semantic information in the network. Network fragments, corresponding to phoneme pronunciations and labeled to specify permitted interconnections to each other and to phonetic constraint nodes, are precompiled to facilitate the rapid generation of pronunciations for new words and thereby enhance the rapid addition of words to the vocabulary even during speech recognition. Functions defined in accordance with linguistic constraints may be utilized during recognition. Different language models and different vocabularies for different portions of a discourse may also be invoked depending, in part, on the discourse history.

26 Claims, 7 Drawing Sheets

U.S. PATENT DOCUMENTS

| | | | | |
|---|---|---|---|---|
| 4,783,803 A | * | 11/1988 | Baker et al. | 704/252 |
| 4,829,576 A | * | 5/1989 | Porter | 704/235 |
| 4,837,831 A | * | 6/1989 | Gillick et al. | 704/245 |
| 4,956,865 A | * | 9/1990 | Lennig et al. | 381/43 |
| 4,975,957 A | * | 12/1990 | Ichikawa et al. | 381/36 |
| 4,980,918 A | * | 12/1990 | Bahl et al. | 381/43 |
| 5,142,585 A | * | 8/1992 | Taylor | 704/233 |
| 5,202,952 A | * | 4/1993 | Gillick et al. | 395/2 |
| 5,212,730 A | * | 5/1993 | Wheatley et al. | 381/43 |
| 5,263,117 A | * | 11/1993 | Nadas et al. | 395/2 |
| 5,267,345 A | * | 11/1993 | Brown et al. | 395/2.64 |
| 5,268,990 A | | 12/1993 | Cohen et al. | 704/200 |
| 5,283,833 A | * | 2/1994 | Church et al. | 381/41 |
| 5,325,421 A | * | 6/1994 | Hou et al. | 379/67.1 |
| 5,333,275 A | * | 7/1994 | Wheatley et al. | 395/2.52 |
| 5,345,537 A | | 9/1994 | Tanaka | 704/255 |
| 5,390,278 A | * | 2/1995 | Gupta et al. | 395/2.52 |
| 5,428,707 A | * | 6/1995 | Gould et al. | 704/231 |
| 5,457,770 A | * | 10/1995 | Miyazawa | 395/2.64 |
| 5,799,276 A | * | 8/1998 | Komissarchik et al. | 704/251 |
| 5,893,058 A | * | 4/1999 | Kosaka | 704/254 |
| 6,125,347 A | * | 9/2000 | Cote et al. | 704/275 |

OTHER PUBLICATIONS

Deng, L. Gutpa, V., Lennig, M., Kenny, P., and Mermelstein, P., "Acoustic Recognition Component of an 86,000–word Speech Recognizer," *ICASSP90* Albuquerque, New Mexico, Apr. 3–6, 1990.

Cheng, Y.M., O'Shaughnessy, D., Gutpa, V., Kenny, P., Lennig, M.., Mermelstein, P., and Parthasarat, S., "Hybrid Segmental–LVQ/HMM For Large Vocabulary Speech Recognition," *ICASSP92* San Francisco, California, Mar. 23–26, 1992.

Ward, W. et al., "Flexible Use of Semantic Constraints in Speech Recognition", *1993 IEEE International Conference on Acoustics, Speech, and Signal Processing*, IEEE, Apr. 27–30, 1993, pp. II–49–II–50.

Harper, Mary P., "Semantics and Constraint Parsing ofWord Graphs", *1993 IEEE International Conference on Acoustics, Speech and Signal Processing*, IEEE, Apr. 17–30, 1993, pp. II–63–II–66.

Hetherington, L., Phillips, M., Glass, J., and Zue, V., "A * Word Network Search for Continuous Speech Recognition," *Proc. Eurospeech*, Berlin, FRG, Sep. 1993.

Phillips, M., Glass, J., and Zue, V. "Automatic Learning of Lexical Representations for Sub–Word Unit Based Speech Recognition Systems," *Proceedings of the Second European Conference on Speech Communication and Technology (Eurospeech)*, Genova, Italy, Sep. 24–26, 1991.

Phillips, M., and Zue, V. "Automatic Discovery of Acoustic Measurements for Phonetic Classification," *Proceedings 1992 International Conference on Spoken Language Processing (ICSLP 92)*, Banff, Alberta, Canada, Oct. 12–16, 1992.

Zue, V., Glass, J., Goddeau, D., Goodine, D., Hirshman, L., Phillips, M., Polifroni J., and Seneff, S. "The MIT ATIS System: Feb. 1992 Progress Report," Fifth DARPA Workshop on Speech and Natural Language, Harriman, NY, FEb. 23–26, 1992.

Zue, V., Glass, J., Goodine, D., Leung, H., Phillips, M., Polifroni, J., and Seneff, S., Integration of Speech Recognition and Natural Language Processing in the MIT Voyager System, *Proceedings of the IEEE 1991 International Conference on Acoustics, Speech and Signal Processing (ICASSP 91)* Toronto, Ontario, Canada, May 14–17, 1991.

Zue, V., Glass, J., Goodine, D., Phillips, M., and Senefff, S. "The SUMMIT Speech Recognition System: Phonological Modelling and Lexical Access," *Proceedings of the IEEE 1990 International Conference on Acoustics, Speech and Signal Processing (ICASSP 90)*, Albuquerque, NM, USA, Apr. 3–6, 1990.

Zue, V., Glass, J., Phillips, M., and Seneff, S. "Acoustic Segmentation and Phonetic Classification in the SUMMIT System," *Proceedings of the IEEE 1989 International Conference on Acoustics, Speech and Signal Processing (ICASSP 89)*, Glasgow, Scotland, UK, May 23–26, 1989.

Zue, V., Seneff, S., Polifroni, J., Phillips, M., Pao, C., Goddeau, D., Glass, J., and Brill, E. "Pegasus: A Spoken Language Interface for On–Line Air Travel Planning," *Proc. ARPA Human Language Technology Workshop*, Princeton, NJ, Mar. 1994.

Zue, V., Seneff, S., Polifroni, J., Phillips, M., Pao, C., Goddeau, D., Glass, J., and Brill, E. "The MIT ATIS System: Dec. 1993 Progress Report," *Proc. ARPA Human Language Technology Workshop*, Princeton, NJ, Mar. 1994.

Mary P. Harper, et al., "Semantics and Constraint Parsing of Word Graphs," International Conference on Acoustics, Speech and Signal Processing, 1993, vol. 2, Apr. 30, 1993, pp. 63–66.

Wayne Ward et al., "Flexible Use of Semantic Constraints in Speech Recognition," International Conference on Acoustics, Speech and Signal Processing 1993, vol. 2, Apr. 30, 1993, pp. 49–50.

* cited by examiner

METHOD AND APPARATUS FOR DYNAMIC ADAPTATION OF A LARGE VOCABULARY SPEECH RECOGNITION SYSTEM AND FOR USE OF CONSTRAINTS FROM A DATABASE IN A LARGE VOCABULARY SPEECH RECOGNITION SYSTEM

This is a continuation application of Ser. No. 08/451,448 filed May 26, 1995 now abandoned.

BACKGROUND OF THE INVENTION

1. Field of the Invention

The invention relates to speech recognition systems and, more particularly, to large-vocabulary speech recognition systems. The system described herein is suitable for use in systems providing interactive natural language discourse.

2. The Prior Art

Speech recognition systems convert spoken language to a form that is tractable by a computer. The resultant data string may be used to control a physical system, may be output by the computer in textual form, or may be used in other ways.

An increasingly popular use of speech recognition systems is to automate transactions requiring interactive exchanges. An example of a system with limited interaction is a telephone directory response system in which the user supplies information of a restricted nature such as the name and address of a telephone subscriber and receives in return the telephone number of that subscriber. An example of a substantially more complex such system is a catalogue sales system in which the user supplies information specific to himself or herself (e.g., name, address, telephone number, special identification number, credit card number, etc.) as well as further information (e.g., nature of item desired, size, color, etc.) and the system in return provides information to the user concerning the desired transaction (e.g., price, availability, shipping date, etc.).

Recognition of natural, unconstrained speech is very difficult. The difficulty is increased when there is environmental background noise or a noisy channel (e.g., a telephone line). Computer speech recognition systems typically require the task to be simplified in various ways. For example, they may require the speech to be noise-free (e.g., by using a good microphone), they may require the speaker to pause between words, or they may limit the vocabulary to a small number of words. Even in large-vocabulary systems, the vocabulary is typically defined in advance. The ability to add words to the vocabulary dynamically (i.e., during a discourse) is typically limited, or even nonexistent, due to the significant computing capabilities required to accomplish the task on a real-time basis. The difficulty of real-time speech recognition is dramatically compounded in very large-vocabulary applications (e.g., tens of thousands of words or more).

One example of an interactive speech recognition system under current development is the SUMMIT speech recognition system being developed at M.I.T. This system is described in Zue, V., Seneff, S., Polifroni, J., Phillips, M., Pao, C., Goddeau, D., Glass, J., and Brill, E. "The MIT ATIS System: December 1993 Progress Report." *Proc. ARPA Human Language Technology Workshop,* Princeton, N.J. March 1994, among other papers. Unlike most other systems which are frame-based systems, (the unit of the frame typically being a 10 ms portion of speech), the SUMMIT speech recognition system is a segment-based system, the segment typically being a speech sound or phone.

In the SUMMIT system, the acoustic signal representing a speaker's utterances is first converted into an electrical signal for signal processing. The processing may include filtering to enhance subsequent recognizability of the signal, remove unwanted noise, etc. The signal is converted to a spectral representation, then divided into segments corresponding to hypothesized boundaries of individual speech sounds (segments). The network of hypothesized segments is then passed to a phonetic classifier whose purpose is to seek to associate each segment with a known "phone" or speech sound identity. Because of uncertainties in the recognition process, each segment is typically associated with a list of several phones, with probabilities associated with each phone. Both the segmentation and the classification are performed in accordance with acoustic models for the possible speech sounds.

The end product of the phonetic classifier is a "lattice" of phones, each phone having a probability associated therewith. The actual words spoken at the input to the recognizer should form a path through this lattice. Because of the uncertainties of the process, there are usually on the order of millions of possible paths to be considered, each of different overall probability. A major task of the speech recognizer is to associate the segments along paths in the phoneme lattice with words in the recognizer vocabulary to thereby find the best path.

In prior art systems, such as the SUMMIT system, the vocabulary or lexical representation is a "network" that encodes all possible words that the recognizer can identify, all possible pronunciations of these words, and all possible connections between these words. This vocabulary is usually defined in advance, that is, prior to attempting to recognize a given utterance, and is usually fixed during the recognition process. Thus, if a word not already in the system's vocabulary is spoken during a recognition session, the word will not successfully be recognized.

The structure of current lexical representation networks does not readily lend itself to rapid updating when large vocabularies are involved, even when done on an "off-line" basis, that is, in the absence of speech input. In particular, in prior art lexical representations of the type exemplified by the SUMMIT recognition system, the lexical network is formed as a number of separate pronunciation networks for each work in the vocabulary, together with links establishing the possible connections between words. The links are placed based on phonetic rules. In order to add a word to the network, all words presently in the vocabulary must be checked in order to establish phonetic compatibility between the respective nodes before the links are established. This is a computationally intensive problem whose difficulty increases as the size of the vocabulary increases. Thus, the word addition problem is a significant issue in phonetically-based speech recognition systems.

In present speech recognition systems, a precomputed language model is employed during the search through the lexical network to favor sequences of words which are likely to occur in spoken language. The language model can provide the constraint to make a large vocabulary task tractable. This language model is generally precomputed based on the predefined vocabulary, and thus is generally inappropriate for use after adding words to the vocabulary.

SUMMARY OF THE INVENTION

A. Objects of the Invention

Accordingly, it is an object of the invention to provide an improved speech recognition system.

A further object of the invention is to provide a speech recognition system which facilitates the rapid addition of words to the vocabulary of the system.

Still a further object of the invention is to provide an improved speech recognition system which facilitates vocabulary addition during the speech recognition process without appreciably slowing the speech recognition process or disallowing use of a language model.

Yet another object of the invention is to provide a speech recognition system which is particularly suited to active vocabularies on the order of thousands of words and greater and total vocabularies of millions of words and greater.

Still a further object of the invention is to provide a speech recognition system which can use constraints from large databases without appreciably slowing the speech recognition process.

BRIEF DESCRIPTION OF THE INVENTION

In accordance with the present invention, the lexical network containing the vocabulary that the system is capable of recognizing includes a number of constructs (defined herein as "word class" nodes, "phonetic constraint" nodes, and "connection" nodes) in addition to the word begin and end nodes commonly found in speech precognition systems. (A node is a connection point within the lexical network. Nodes may be joined by arcs to form paths through the network. Some of the arcs between nodes specify speech segments, i.e., phones.) These constructs effectively precompile and organize both phonetic and syntactic/semantic information and store it in a readily accessible form in the recognition network. This enables the rapid and efficient addition of words to the vocabulary, even in a large vocabulary system (i.e., thousands of active words) and even on a real-time basis, i.e., during interaction with the user. The present invention preserves the ability to comply with phonetic constraints between words and use a language model in searching the network to thereby enhance recognition accuracy. Thus, a large vocabulary interactive system (i.e., one in which inputs by the speaker elicit responses from the system which in turn elicits further input from the speaker) such as a catalogue sales system can be constructed. The effective vocabulary can be very large, (i.e., millions of words) without requiring a correspondingly large active (random access) memory because not all the words in it need be "active" (that is, connected into the lexical recognition network) at once.

In accordance with the present invention, the vocabulary is categorized into three classes. The most frequently used words are precompiled into the lexical network; typically, there will be several hundred of such words, connected into the lexical network with their phonetically permissible variations. Words of lesser frequency are stored as phonemic baseforms. A baseform represents and idealized pronunciation of a word, without the variations which in fact occur from one speaker to another and in varying context. The present invention may incorporate several hundred thousand of such baseforms, from which a word network may rapidly be constructed in accordance with the present invention. The least frequently used words are stored as spellings. New words are entered into the system as spellings (e.g., from an electronic database which is updated periodically). To make either one of the least frequently used words or a completely new word active, the system first creates a phonemic baseform from the spelling. It then generates a pronunciation network from the phonemic baseforms in the manner taught by the present invention.

The phonetic constraint nodes (referred to hereinafter as PC nodes of PCNs) organize the inter-word phonetic information in the network. A PC node is a tuple, PC (x, y, z . . . ) where the x, y, z are constraints on words that are, or can be, connected to the particular node. For example, x may specify the end phone of a word; y the beginning phone of a word with which it may be connected in accordance with defined phonetic constraints; and z a level of stress required on the following syllable. While tuples of any desired order (the order being the number of constraints specified for the particular PCN) may be used, the invention is most simply described by tuples or order two, e.g., PCN (x, y). Thus, PCN (null, n) may specify a PCN to which a word with a "null" ending (e.g., the dropped "ne" in the word "phone" is connected and which in turn will ultimately connect to words beginning with the phoneme /n/.

Word Class Nodes (referred to hereinafter as WC nodes or WCNs) organize the syntactic/semantic information in the lexical network and further facilitate adding words to the system vocabulary. Examples of word class nodes are parts-of-speech (e.g., noun, pronoun, verb) or semantic classes (e.g., "last name", "street name", or "zip code"). Both the words that form the base vocabulary of the speech recognition system (and therefore are resident in the lexical network to define the vocabulary that the system can recognize), as well as those that are to be added to this vocabulary are associated with predefined word classes.

Words are incorporated into the lexical network by connecting their begin and end nodes to WC nodes. The WCNs divide the set of words satisfying a particular PCN constraint into word classes. There may be a general set of these word classes, e.g., nouns, pronouns, verbs, "last name", "street name", "zip code", etc. available for connection to the various PCNs. On connecting a specific instance of a set member (e.g., "noun") to a PCN, it is differentiated by associating a further, more specific characteristic to it, e.g., "noun ending in /n/", "noun ending in "null", etc. Each specific instance of a WCN connects to only one particular PCN. So, for example, there may be a "noun" WCN connected to the (null, n) PCN which is separate from a "noun" WCN connected to the (vowel, n) PCN. To qualify for connection to a given WC node, a word must not only be of the same word class as the WC node to which it is to be connected, but is connected, e.g., noun ending in "null".

The PC nodes are interconnected through word connection nodes (hereinafter referred to as CONN nodes) which define the allowable path between the end node of a word and the begin node of a following word. Effectively, CONN nodes serve as concentrators, that is, they link those PC nodes which terminate a word with those PC nodes which begin a succeeding word which may follow the preceding word under the phonetic constraints that are applicable. These constraints are effectively embedded in the WC nodes, the PC nodes, the CONN nodes, and their interconnections.

In order to add a word to the lexical network, it is necessary first to create a pronunciation network for that word. A given word will typically be subject to a number of different pronunciations, due in part to the phonetic context in which they appear (e.g., the end phoneme /n/ in the word "phone" may be dropped when the following word begins with an /n/ (e.g., "number"), and in part to other factors such as speaker dialect, etc. Variations in pronunciation which are due to differing phonetic context are commonly modeled by standard rules which define, for each phoneme, the ways in which it may be pronounced, depending on the surrounding context. In the present invention, network fragments corresponding to the operation of these rules on each phoneme are precompiled into binary form and stored in the system, indexed by phoneme. The precompiled network fragments include labels specifying allowed connections to other fragments and associations with PCNs. These labels are of two types: the first refers to the phoneme indexes of other pronunciation networks: the second refers to specific branches within the pronunciation networks which are allowed to connect to the first pronunciation network. Pronunciation networks for phonemes precompiled according to this method allow the rapid generation of pronunciations for new words to thereby facilitate word addition dynamically, i.e., during the speech recognition process itself.

In adding a word to the lexical network, the word is associated with a phonemic baseform and a word class. Its pronunciation network is generated by choosing the network fragment associated with phonemes in the phonemic baseform of the word and then interconnecting the fragments according to the constraints at their end nodes. The ensuing structure is a pronunciation network typically having a multiplicity of word begin and word end nodes to allow for variation in the words which precede and follow. The resultant pronunciation network is linked to the word class nodes in the manner described above.

In the present invention, the words are organized by word class, and each added word is required to be associated with a predefined word class in order to allow use of a language model based on word classes during the search of the lexical network, even with added words. Predefined words are not required to belong to a word class; they may be treated individually. The language model comprises functions which define the increment to the score of a path on leaving a particular word class node or word end node or on arriving at a particular word class node or word begin node. A function may depend on both the source node and the destination node.

In accordance with the present invention, constraints from electronic databases are used to make the language vocabulary task tractable. The discourse history of speech frequently can also provide useful information as to the likely identification of words yet to be uttered. In the present invention, the discourse history is used in conjunction with a database to invoke different language models and different vocabularies for different portions of the discourse. In many applications, the system will first pose a question to the user with words drawn from a small-vocabulary domain. The user's response to the question is then used to narrow the vocabulary that needs to be searched for a subsequent discourse involving a large domain vocabulary. As an example, in a catalogue sales system, the system may need to determine the user's address. The system will first ask: "What is your zip code?", and then use the response to fill in the "street name" word class from street names found in the database that have the same zip codes as that of the stated address. The street names so determined are quickly added to the system vocabulary, and street names previously in the vocabulary are removed to provide the requisite room in active memory for the street names to be added and to reduce the size of the network to be searched. The language model, i.e., the probabilities assigned to the various street names so selected, may be established a priori or may be based on other data within the system database, e.g., the number of households on each street, or a combination of these and other information items. Similarly, the system may ask for the caller's phone number first, then use the response and an electronic phonebook database to add to the vocabulary the names and addresses corresponding to the hypothesized phone numbers.

The extensive use of large electronic databases while interacting with the user necessitates an efficient database search strategy, so that the recognition process is not slowed appreciably. In accordance with the present invention, hash tables are employed to index the records in the database, and only that information which is needed for the task at hand is stored with the hash tables.

BRIEF DESCRIPTION OF THE DRAWINGS

For a fuller understanding of the nature and objects of the invention, reference should be had to the following detailed description of the invention, taken in connection with the accompanying drawings, in which.

DESCRIPTION OF THE PREFERRED EMBODIMENT OF THE INVENTION

Figure 1:
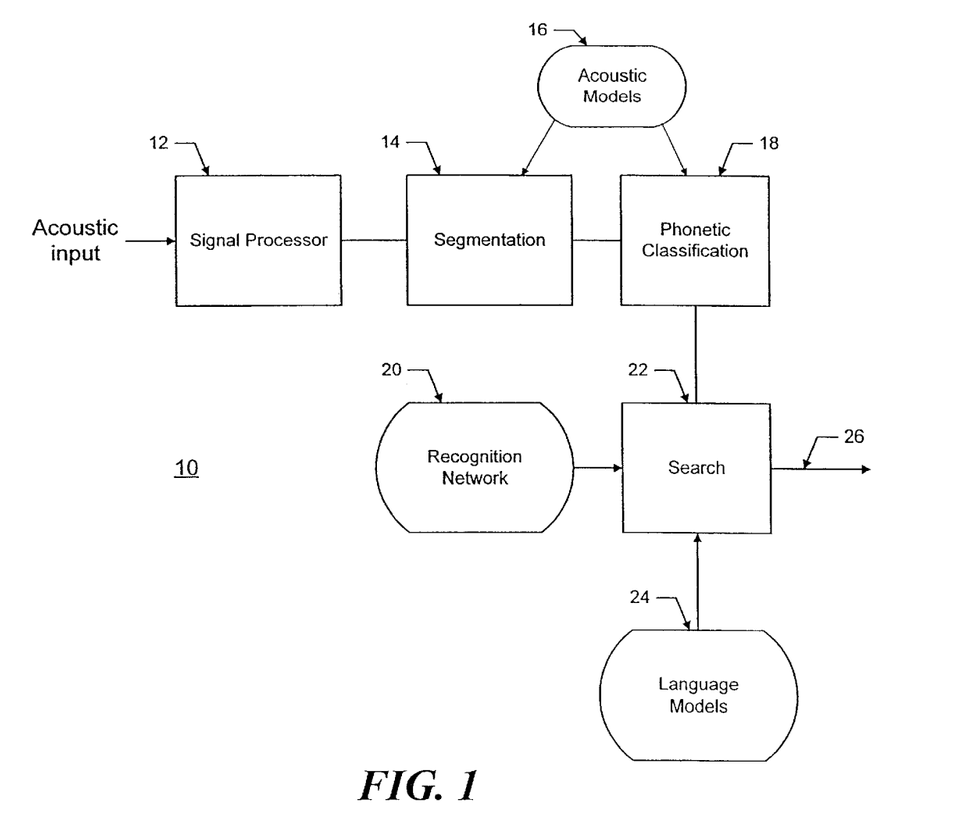
FIG. 1 is a block and line diagram of a conventional form of speech recognition system.

In FIG. 1, a speech recognition system 10 comprises a signal processor 12 which converts the acoustic input from a speaker into a form suitable for computer processing, e.g., a sequence of vectors, each representing the frequency spectrum of a portion of the speech. The resultant signals are then analyzed in a segmenter 14 to hypothesize boundaries between the subconstituents (termed "segments") of the input. These boundaries delineate hypothesized "phones" corresponding to phonemes. (A phoneme is a symbol that designates a basic sound of the language, e.g., the sound of the letter "n"; it is enclosed between slashes: /n/. A phone is a symbol representing the pronunciation of a phoneme; it is enclosed between brackets, e.g., [n]. The ARPABET system of notation will be used in the following to represent phones and phonemes). Several begin- and end-times may be hypothesized for each phone, resulting in overlapping hypothesized regions. The segmentation is performed in accordance with acoustic models 16 available to the system.

The output of the segmenter is applied to a phonetic classifier 18 which generates a phonetic lattice representation of the acoustic input. This lattice describes the various phones corresponding to the hypothesized segments, and the probabilities associated with each. Paths through this lattice, each of which represents a hypothesis of a sequence of phones corresponding to the acoustic input, are compared with possible paths in a corresponding recognition network 20 in a search stage 22. Language models 24 guide the search for the best match between the phonetic paths generated by classifier 18 and the paths traced through recognition network 20. The resultant is an output 26 representing a recognized communication, e.g., a sentence.

Figure 2:
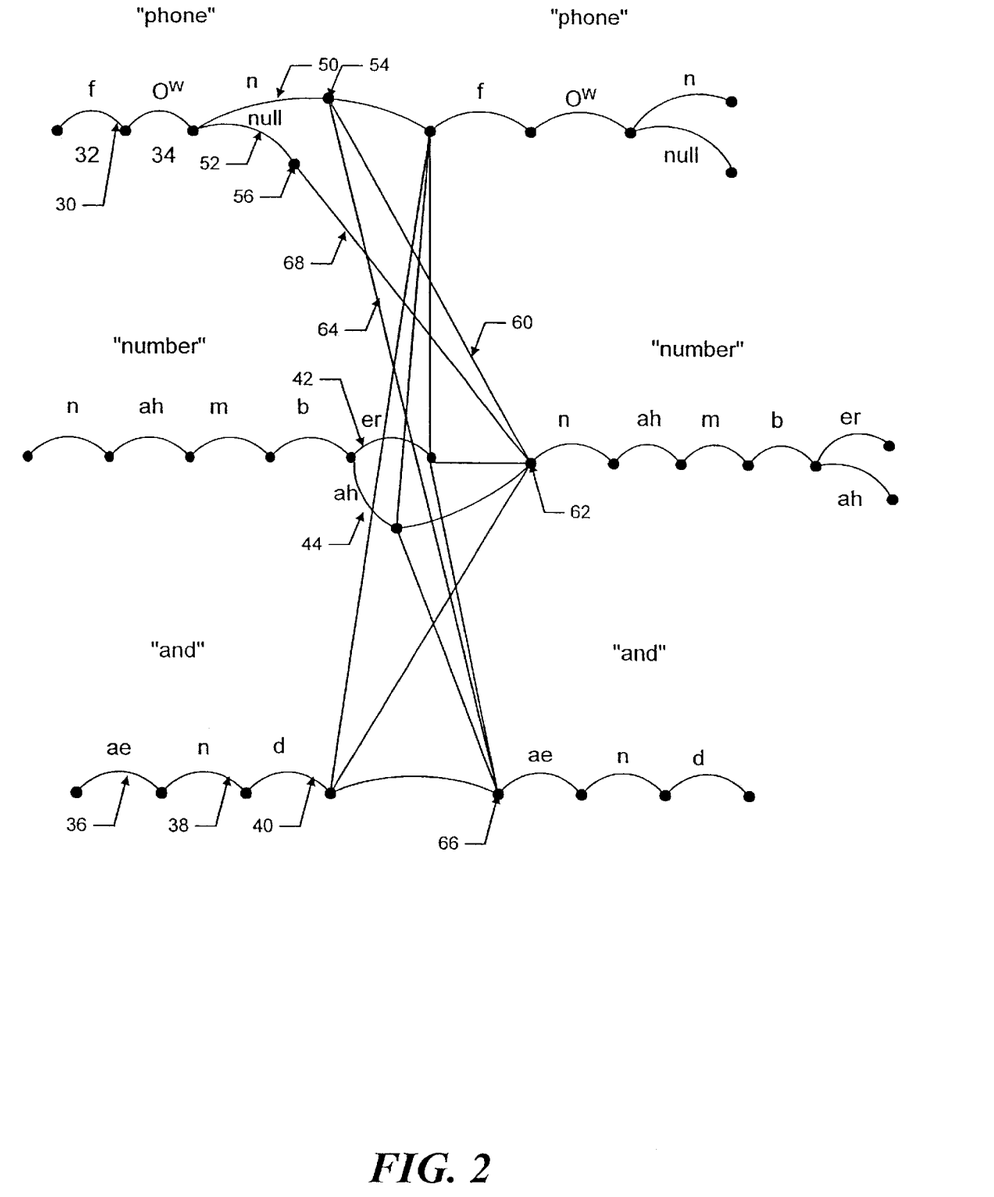
FIG. 2 is a diagram showing a portion of a lexical network as currently used in speech recognition systems.

FIG. 2 illustrates a portion of a typical lexical recognition network commonly used in phonetic-based speech recognition systems, and shows how words have commonly been connected in a lexical network prior to the present invention. This figure illustrates typical permitted combinations involving the words "phone", "number", and "and" as an aid in explaining the present invention. Each phone of the respective words is represented as an arc (e.g., arc 30) between two nodes (e.g., node 32 and node 34). Phones are connected sequentially to form a word. For example, the word "and" is formed of the phones /ae/ (arc 36), /n/ (arc 38), and /d/ (arc 40). A particular phoneme may have alternative pronunciations in a word. For example, the final phoneme in the word "number" may be /er/ (arc 42) or /ah/ (arc 44). A phoneme may sometimes be omitted. For example, the final /n/ (arc 50) in the word "phone" is sometimes omitted in speech; this is indicated by alternatively terminating the word in the "null" phone (arc 52).

The permitted connections between words is shown by links connecting the end nodes of one word with the begin nodes of other words. For example, link 60 connects the end node 54 of the word "phone" to the begin node 62 of the word "number", while link 64 connects the end node 54 of the word "phone" to the begin node 66 of the word "and".

It will be noticed that the null end node 56 of the word "phone" has a connection to the begin node 62 of the word "number" via link 68, but has no connection to the begin node 66 of the word "and". This indicates that a pronunciation which drops the final phoneme (/n/) in "phone" when pronouncing the successive words "pho(ne)" and "and" is not permitted, but such a pronunciation would be permitted in pronouncing the string "pho(ne) number".

It should be understood that FIG. 2 is shown in an expanded form for purposes of clarity, that is, the words are repeated in order to show the possible connections between them more clearly. In an actual implementation, the words need not be repeated. Further, it will be noted that a string such as "phone phone" is shown as a possible sequence in FIG. 2, since this is phonetically permissible, although syntactically and semantically unlikely.

In order to add words to a vocabulary structured in the manner shown in FIG. 2, it is necessary to test the compatibility of the begin and end nodes of the words against the begin and end nodes of all other words in order to determine the allowed connections between words. This requires substantial computational processing when the size of the vocabulary is large, and would be unacceptably slow for the user when "on-line" expansion of the vocabulary is sought, that is, when it is sought to add words to the vocabulary during a dialogue with the system. This has been a major impediment to the construction of large vocabulary interactive speech recognition systems.

Figure 3:
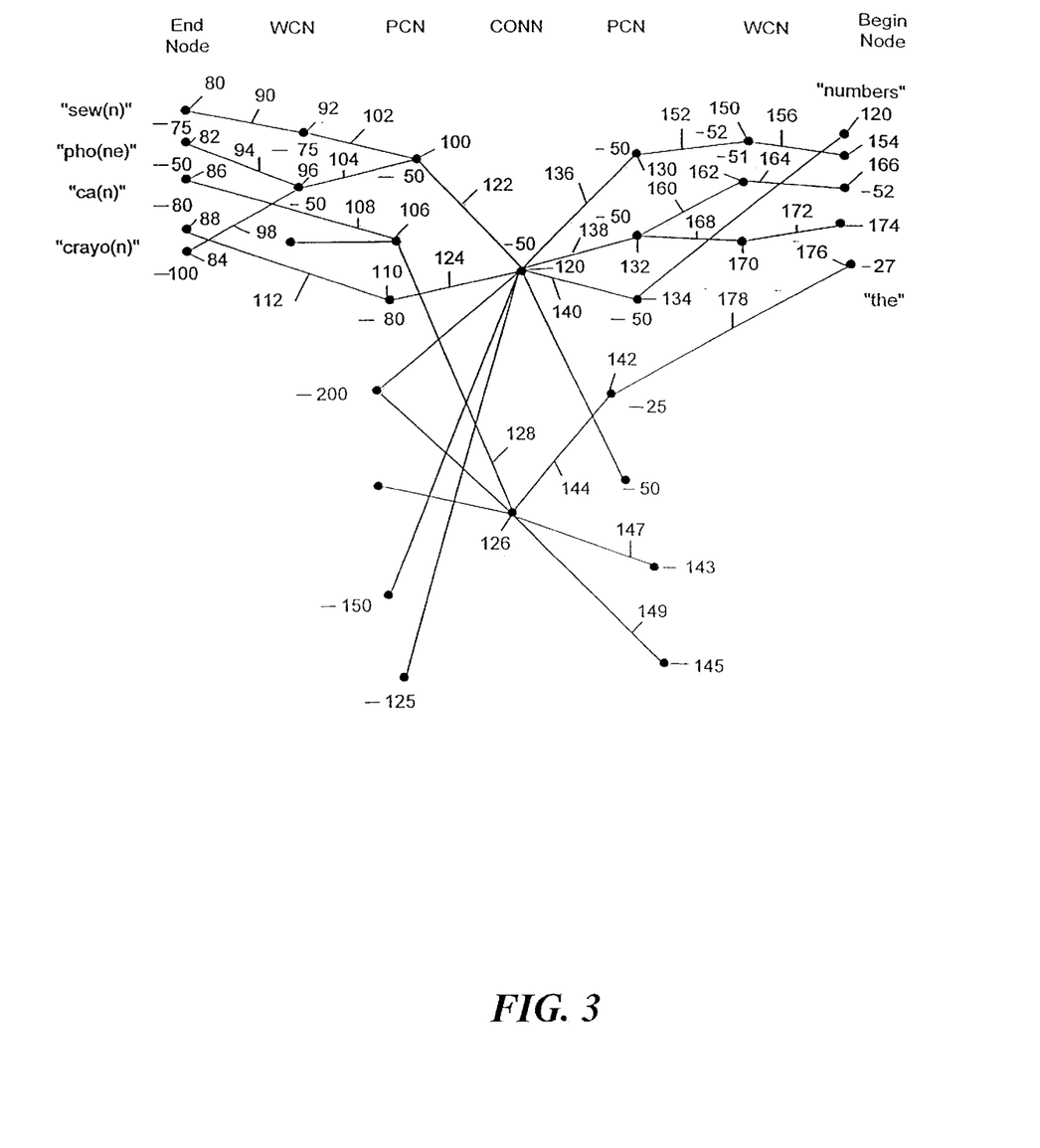
FIG. 3 is a diagram showing the word connection portion of a lexical network in accordance with the present invention.

FIG. 3 shows the structure of the word connection portion of a lexical representation network in accordance with the present invention which solves this problem. In FIG. 3, nodes 80, 82 and 84 are connected to receive the end phoneme of a particular pronunciation of the each of the words "sewn", "phone", and "crayon", respectively. Node 86 is connected to receive the end phoneme of the word "can". The nodes 80–86 are referred to as "end nodes", since they end the word connected to them. Node 80 is connected via an arc 90 to a Word Class node 92; word class nodes organize word pronunciations according to phonetic as well as syntactic and/or semantic information. For example, the class of word pronunciations connected to node 92 might be "past participles ending in /n/ in which the /n/ is not pronounced". Similarly, node 82 is connected via a link 94 to a Word Class node 96 to which node 84 is also connected via a link 98. Word Class node 96 may comprise, for example, the class "nouns ending in /n/ in which the /n/ is not pronounced."

Word Class nodes 92 and 96, in turn, are connected to a phonetic constraint node 100 via arcs 102, 104, respectively.

Phonetic constraint nodes embody phonetic constraints. For example, phonetic constraint node 100 may comprise the constraint pair (null, n), indicating that nodes connected into it from the left are characterized by "null" final phoneme, while those to which it connects to the right are characterized by an initial /n/. In most instances word end nodes are connected to phonetic constraint nodes through word class nodes. However, some words in the lexical network may in effect form their own word class. Such words are directly connected to a phonetic constraint node. Such is the case with the word "can", whose end node 86 is directly connected to a phonetic constraint node 106 via a link 108.

Phonetic constraint nodes 100 and 110 feed into a word connection node 120 via links 122, 124, respectively. Similarly, node 106 feeds into connection node 126 via an arc 128. The pattern outward from the connection nodes is the reverse of the pattern inward to the nodes, that is, connection node 120 expands to phonetic constraint nodes 130, 132, 134 via links 136, 138 and 140, respectively. Similarly, connection node 126 expands to phonetic constraint node 142 via a link 144, as well as to nodes 143, 145 via links 147, 149, respectively. Phonetic constraint node 130 is connected to a Word Class node 150 via a link 152 and then is connected to the begin node 154 of a qualified word pronunciation (e.g., a typical pronunciation of the word "number") via a link 156. The word "qualified" indicates that the begin node to which a connection node leads satisfies the phonetic constraints associated with the end nodes feeding into that connection node. In FIG. 3, for example, the connection node 120 is linked to words normally ending in "n" in which the final "n" may be dropped if the following word begins with "n". Thus, the final "n" in the word "phone" may be dropped when the word "phone" is followed by the word "number". In similar fashion, phonetic constraint node 132 is connected via arc 160 to Word Class node 162 and then via arc 164 to word begin node 166. Node 132 is also connected via arc 168 to Word Class node 170 and then via arc 172 to word begin node 174. Finally, phonetic constraint node 142 is directly connected to word begin node 176 via arc 178 without connection through an intermediary Word Class node.

The structure of the lexical networks shown in FIG. 3 greatly facilitates the dynamic addition of words to the lexical network, that is, the addition of such words during the progress of a discourse and concurrent with speech recognition. Specifically, permissible word classes and phonetic constraints are defined in advance and the connections between the Word Class nodes, the phonetic constraint nodes and the connection nodes are precompiled and stored in the lexical network of the system prior to speech recognition. The end nodes and begin nodes of a defined "base" vocabulary are connected to the Word Class nodes in the manner illustrated in FIG. 3 in cases where such words belong to the defined Word Classes, and are connected directly to phonetic constraint nodes otherwise (e.g., when the word is of sufficient frequency to, in effect, form its own Word Class).

Words which are not precompiled in the baseform lexical network are added to the network dynamically by first forming the pronunciation network of the word (described in more detail in connection with FIG. 4) and then connecting the end nodes and the begin nodes of the words to the appropriate Word Class nodes in accordance with the word-class and phonetic constraints embodied in the respective nodes. For example, a pronunciation of a noun ending in "n" in which the final "n" may be dropped if the following word begins with "n" would be connected to a noun Word Class node which itself is connected to a phonetic constraint node having the constraint (null, n) which specifies the constraint of a word terminating in a "null" sound which must be followed by a word beginning with "n".

Each word end and word begin node contains the index of the PCN it connects to (through a WCN). The present invention performs a simple lookup (thereby eliminating the need for run-time computations) to establish phonetic compatibility between the end nodes and begin nodes of the words being added to the system vocabulary and thus enables the addition of the words in "real time", that is, concurrent with interaction with the user of the system. This in turn can dramatically reduce the size of the vocabulary that must be precompiled and stored in active (random access) memory, and thus enables expansion of the effective range of the vocabulary for a given system, since the needed vocabulary can be formed "on the fly" from word spellings or from phonemic baseforms requiring rather limited storage capacity in comparison to that required for a vocabulary which is completely precompiled and integrated into the lexical network.

Figure 4A:
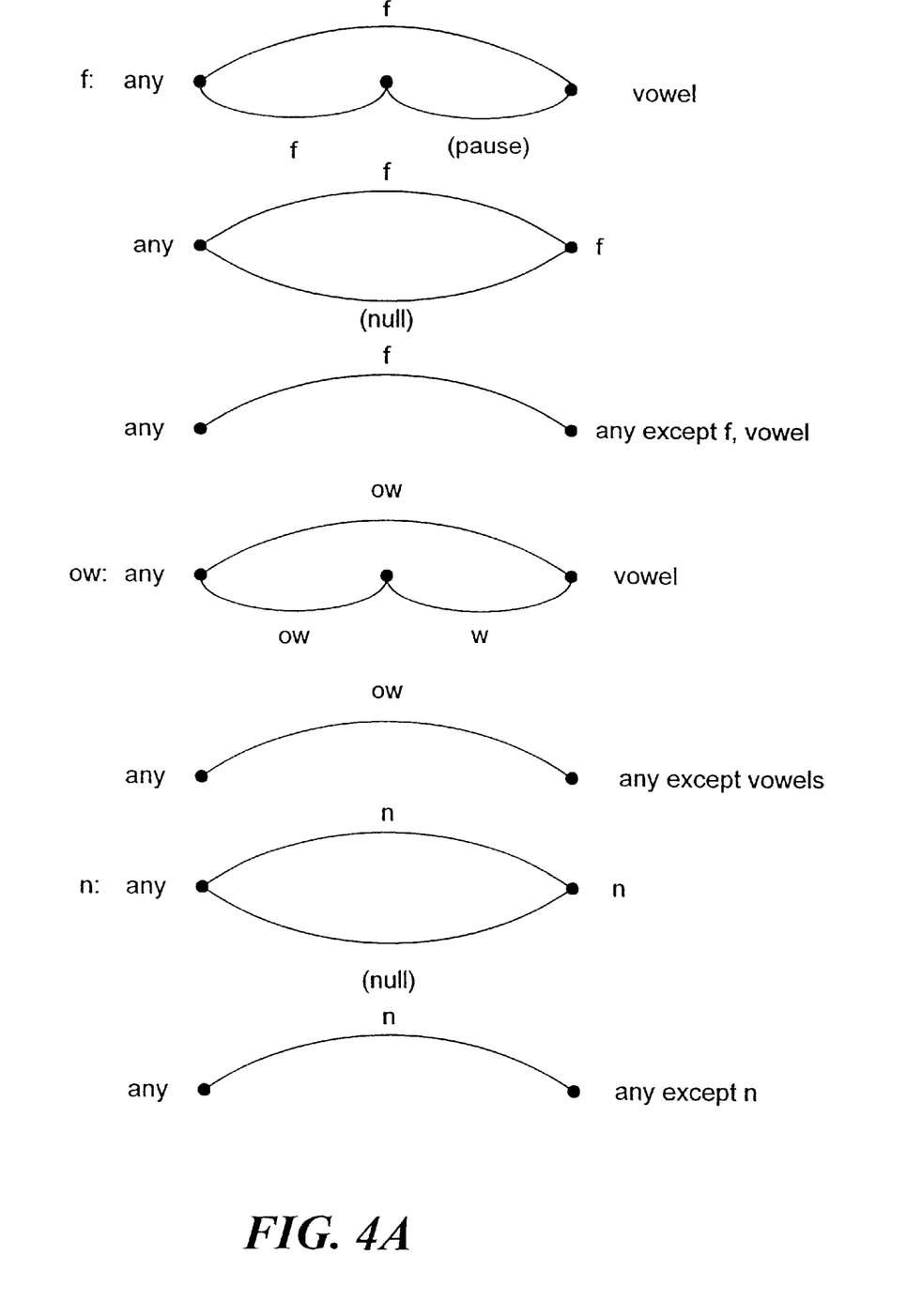
FIG. 4 illustrates the creation of the pronunciation network for a word in accordance with the present invention.

FIG. 4A shows the manner in which pronunciation networks are generated from phonemic baseforms and stored in accordance with the present invention. In particular, the word "phone" has a phonemic baseform /fown/. A phonemic baseform is the "ideal" pronunciation of the word, i.e., without the slurring that occurs in rapid or casual speech. The network fragment for each phoneme of the word is created by applying rules which embody phonetic constraints that depend on the context of the phoneme, that is, on the surrounding phonemes. As illustrated in FIG. 4A, the phoneme /f/ may be pronounced as [f] or a [f pause] if it is followed by a vowel; is pronounced [f] or is omitted (null pronunciation) if it is followed by /f/; and is pronounced as [f] if it is followed by any phoneme except another /f/ or a vowel. Similarly, the phoneme /ow/ is pronounced as [ow] or as [ow w] whenever followed by a vowel, and is pronounced as [ow] in all other cases. Finally, the phoneme /n/ is pronounced [n] or is omitted (null pronunciation) when followed by /n/, and is pronounced as [n] in all other cases. The phonetic fragments corresponding to the individual phonemes of the word "phone", as well as the resultant word formed from connecting the fragments together in accordance with the phonetic constraints embedded in them, is shown in FIG. 4A.

In accordance with the present invention, the phonetic fragments are precompiled (that is, in advance of speech recognition) and stored in binary form. They are indexed by phoneme for rapid retrieval. Given a phoneme's baseform, the appropriate phonetic fragments are strung together to form words. It will be noted from FIG. 4A that the words thus formed may have multiple connections; these may occur at the beginning of the word, at the end, or both, and are referred to as "frayed edges". Each node at a frayed edge corresponds to a word begin or word end node of a particular pronunciation of the word. Each word begin or word end node connects to exactly one PCN (through a WCN in the case of dynamically added words).

Figure 4B:
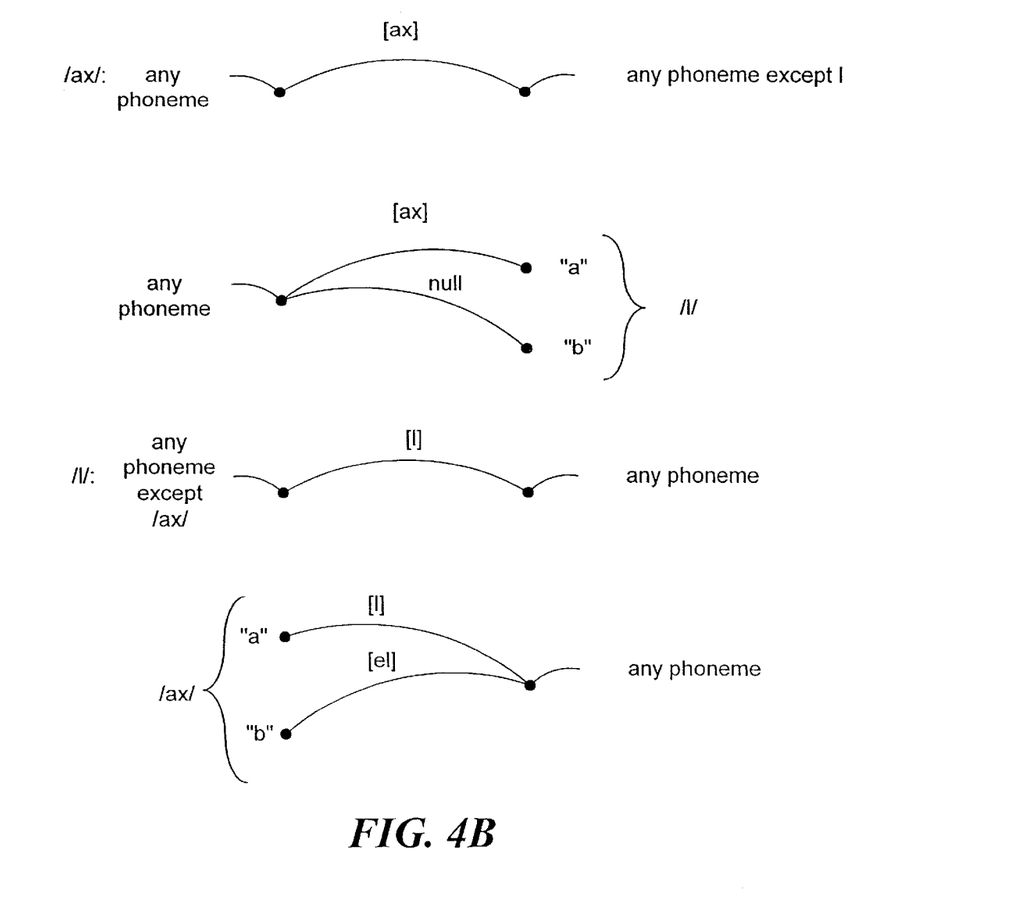

The phonetic constraints according to which the fragments are linked to each other and to PCNs (through WCNs) are expressed in terms of the phoneme indexes. In some cases, further restrictions may need to be imposed on the connections of the word into the lexical network. For example, the phoneme /ax/ ("schwa" in ARPABET notation) may at some times be pronounced as the phone [ax] and at other times as the phone [null]. Similarly, the phoneme /l/ may at times be pronounced as the phone [l] and at other times as the phone [el] (syllabic /l/). (An example is the differing pronunciations of the word "vowel" as [v aw ax l] or alternatively as [v aw el].) The conditions under which the respective pronunciations are permissible are shown in FIG. 4B. For the standard English pronunciation of /ax l/, the combination [ax][l] is permissible, as is the combination [null][el], but the combinations [ax][el] and [null][l] are not. In accordance with the present invention, the permissible combinations may be formed, and the impermissible combinations prevented, by "tagging" the "ends" of a given fragment and restricting the connection of a fragment end to those nodes having not the permitted phonetic constraint but also the same tag as the fragment end to which they are to be connected.

This is illustrated more clearly in FIG. 4B which shows the phonetic fragments for the phoneme /ax/ when it is followed by any phoneme except the phoneme /l/ as well as when it is followed by /l/ FIG. 4B also shows the phonetic fragment for the phoneme /l/, both when it is preceded by the phoneme /ax/ and otherwise. The fragment corresponding to the phoneme /ax/ followed by the phoneme /l/ has tags "a" and "b" associated with the alternate pronunciations of phones [ax] and [null], respectively. Similarly, the fragment corresponding to the phoneme /l/ preceded by the phoneme /ax/ has tags "a" and "b" associated with the alternate pronunciations [l] and [el], respectively. When connecting the fragments together in the sequence /ax/ /l/, a node tagged as "a" in the phoneme /ax/ can connect only to a node similarly tagged as "a" in the phoneme /l/, and the same is true for the nodes tagged as "b" in these phonemes. It will be understood that this structure is used between words, as well as within words, that is, this structure is also used in connecting words into the lexical network where appropriate. Thus, the connection into the network may be done on the basis of matching the phonetic constraints (based on phoneme indexes) at the begin and end nodes of a word to the phonetic constraints of a word class or phonetic constraint node, while at the same time preserving the further constraints that apply to the particular connection. This facilitates rapid addition of words to the lexical vocabulary.

Figure 5:
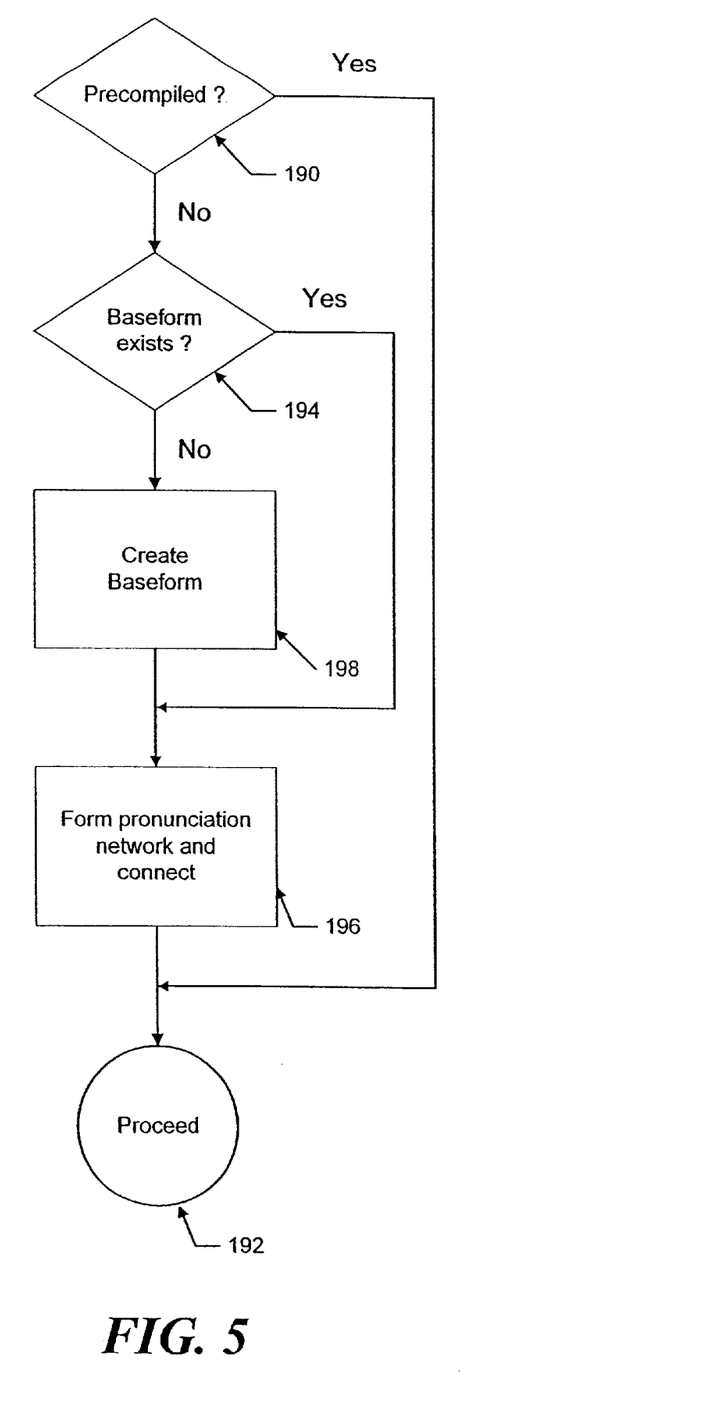
FIG. 5 is a flow diagram showing the manner in which words are added to the system vocabulary.

During speech recognition, the system searches through the lexical network to find matches between the sounds emitted by the speaker and words stored in the system. As illustrated in FIG. 5, if a word candidate is found to be stored in the system at the time of recognition (step 190), the system proceeds with the recognition process (step 192). If it is not found, the system checks to determine whether a baseform of the word is stored in the system (step 194). If it is, the system forms the word from the baseform as described in connection with FIG. 4, connects it into the lexical network as described in connection with FIG. 3, and proceeds with the recognition process. If a baseform of the word being sought is not stored in the system, the baseform is first created in accordance with defined text-to-phoneme rules (step 198).

Figure 6:
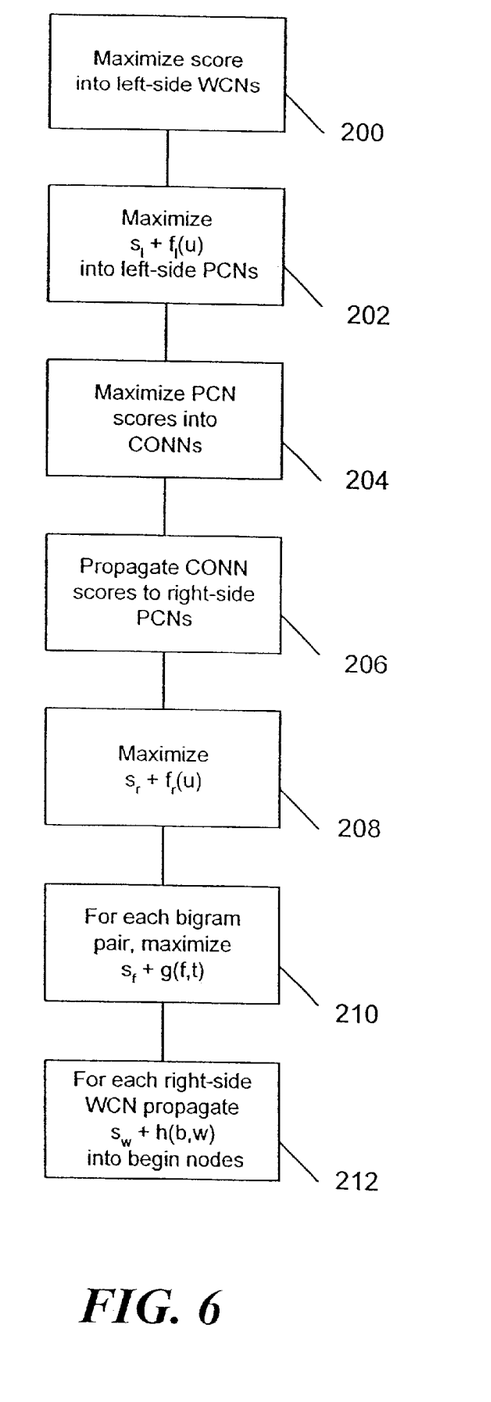
FIG. 6 is a flow diagram of a lexical network search in accordance with the present invention.

Turning now to FIG. 6, a flow diagram of the search process through the lexical network is shown. The form of the search overall is of the type described by Viterbi, but expanded to use the capabilities of the present invention. The goal of the search is to find the most probable path through the lexical network at each stage in the network (i.e., at each node in the network). In achieving this, the cumulative probability of occurrence of the linguistic condition associated with a given node is recorded and stored for subsequent use.

As an example, refer again to FIG. 3. The end nodes 80, 82, 84, and 88 have "scores" associated with them of −75, −50, −100, and −80, respectively. These numbers are proportional to the log of the probabilities at the respective nodes of the most probable paths into those nodes. The task is to propagate those probabilities through the lexical network to the "begin" nodes 154, 166, etc. This is accomplished as follows:

The first step (FIG. 6, step 200) is to maximize the scores from the various end nodes into the left-side word class nodes. This is accomplished by choosing the maximum score, at each word class node, from the scores of the end nodes connected to the particular word class node. Thus, in FIG. 3, node 96 is connected to both node 82 (with a score of −50) and node 84 (with a score of −100). Accordingly, the higher of these scores (−50) is propagated to node 96. Similarly, node 92 is shown as being connected to only a single end node, node 80, which has a score of −75. Accordingly, the score −75 is propagated to node 92.

Next (FIG. 6, step 202), the scores into the left side phonetic constraint nodes are maximized. In the algorithm for calculating the scores, the general functions $f_l()$, $f_r()$, $g()$, and $h()$ are used. The functions take as arguments a node (actually, the word or word class associated with the node) or a pair of nodes. By specifying these functions, different language models can be implemented. The score into a left-side phonetic constraint pair comprises the left side entering score $s_l$ plus a function $f_l(u)$, where $s_l$ is the end node score in the case where the source node (that is, the node preceding the phonetic constraint node) is an end node and $s_l$ is the score of the word class node when the source node is a word class node. Similarly, $f_l(u)$ is a function defined on the end node u in the case where the source node is an end node, and defined on the word class node u in the case where the source node is a word class node. Typically, $f_l(u)$ is a probability, i.e., it defines the likelihood of occurrence of the condition associated with a given node. For example, it may define the likelihood of a particular word class within the system vocabulary. The maximum value of the score so computed for each left-side phonetic constraint node is then determined and assigned to the corresponding phonetic constraint node. For example, node 100 is connected to node 92, which has a score of −75, and also to node 96, which has a score of −50. The score assigned to node 100 is then determined by selecting the maximum of $-75+f_l(92)$ (the total score of node 92) and $-50+f_l(96)$ (the total score of node 96). For purpose of simplicity only, $f_l()$ will be chosen to be zero in this example, and the score −50 is assigned to PCN 100.

The maximum phonetic constraint node scores into the connection nodes are then determined (FIG. 6, step 204). Thus, in FIG. 3, node 100 has a score of −50 and this can be seen to be larger than the score from any other node entering into connection node 120. Accordingly, node 120 is assigned the score −50. The scores for the other connection nodes are computed similarly.

The next step (FIG. 6, step 206) is to propagate the connection node scores to the right side phonetic constraint nodes. Thus, the score −50 for node 120 is propagated to nodes 130, 132, and 134 which are connected to node 120. The scores from the other connection nodes in the network are similarly propagated to the phonetic constraint nodes to which they are respectively connected.

The scores into the right side word class nodes are then maximized (FIG. 6, step 208) in those cases in which the phonetic constraint nodes are connected to the begin nodes via word class nodes; in cases where the phoneme constraint pairs are connected directly to the begin nodes without first traversing intermediate word class nodes, the score into the begin nodes are maximized. For example, in FIG. 3, phonetic constraint node 130 is connected to begin node 154 via word class node 150. Conversely, phonetic constraint node 134 is connected directly to node 120 without traversing a word class node.

The score which is being maximized can be expressed as $s_r+f_r(u)$ where $s_r$ is the score of the right side phonetic constraint node which is connected to either the word class node or the begin node, and $f_r(u)$ is a function that specifies a score increment (typically a log probability) associated with the node u (either word class node or begin node) to which the phonetic constraint node in question is connected. For example, the function $f_r(u)$ may be defined as log (C(u)N), where C(u) is the word count in a representative text of the word or word class associated with the particular node u and N is the total number of words in the representative text.

For purposes of illustration, assume that word class node 150 comprises the class of singular nouns beginning with the letter "n" and that in a sample text of one million words, ten thousand such nouns were found. The function $f_r(u)=f_r(150)$ would then be evaluated as $f_r(150)=\log(10,000/1,000,000)=-2$. Accordingly, the score at this node is given as $s_r+f_r(u)=-50+(-2)=-52$. This score is shown at node 150 in FIG. 3 but "crossed out" for reasons which will shortly be explained.

Phonetic constraint node 142 is directly linked to begin node 176, and does not pass through any intermediate word class node. Accordingly, the score of begin node 176 is evaluated via the function $s_r+f_r(u)$. As shown in FIG. 3, the value of $s_r$ with respect to node 176 is the value of node 142, namely, −25. Note that, in FIG. 3, node 176 is shown as the beginning of the word "the". Assume that, in a text of one million words, the word "the" occurs ten thousand times. The function $f_r(176)$ is then evaluated as $f_r(176)=\log[{}^{10,000}/{}_{1,000,000}]=-2$ and the score at node 176 is then $-25-2=-27$.

Once the maximum scores from all PCNs into the begin nodes or WCNs are evaluated, the system then determines whether any bigram statistics for the word pairs in question exist in the language model. In accordance with the present invention, the maximum score for each bigram pair (f, t) is determined as $s_f+g(f,t)$, where $s_f$ is the score of a "from" node (i.e., a word class node in cases where an end node is connected through a word class node, and an end node otherwise) on the left side of a connection node (see FIG. 3) and g(f, t) is a function defined jointly on the "from" node (i.e., a word class node in cases where an end node is connected through a word class node, and an end node otherwise) and on a "to" node (i.e., a word class node in cases where a begin node is connected through a word class node, and a begin node otherwise) on the right side of a connection node that connects the respective "from" and "to" nodes.

As a specific example to illustrate this, consider the relationship between "from" node 96 (e.g., the word class of "nouns ending in "n" but pronounced with the n omitted") and "to" node 150 (the word class of "singular nouns starting with "n""). g(f, t) may be defined as log [C(f,t)/C(f)], where C(f,t) is the count of the word class pair f,t and C(f) is the count of word class f in some representative text. Assume that it has been determined that $g(96,150)=\log[C(96,150)/C(96)]=-1$. The value of $s_f$ at node 96 is −50, as shown. Thus, the function $s_f+g(f,t)=-50+(-1)=-51$. Since this is greater than the prior value, −52, associated with node 150, node 150 takes on the new value −51. Assuming that all other paths to node 150 through CONN node 120 lead to lower scores, −51 is the final value for node 150.

In cases where the begin nodes are reached through right-side word class nodes, as opposed to directly from right-side phonetic constraint nodes, a final adjustment to the score is performed (FIG. 6, step 212). This adjustment comprises determination of the function $s_w + h(b, w)$, where $s_w$ is the score of the word class node that has so far been determined and $h(b, w)$ is a function which depends on the source word class node and the destination word begin node. In the present example, h(b,w) may be defined as the frequency of occurrence of the word at the begin node divided by the frequency of occurrence of the word class node in question. For example, for word class node 150 and begin node 154, the previously computed score, $s_w$, is −51. The function $h(b, w) = h(154, 150) = \log[C(154, 150)/C(150)]$ where C(154, 150) is the count of occurrences of word 154 when it belonged to word class 150. If there are 1,000 instances of the word "number" used as a noun in a given text, and 10,000 instances of the word class "singular noun starting with "n"", the function h(154, 150) has a value of −1. The final score at begin node 154 is then −51+(−1)=−52. Similar calculations occur for the other nodes.

Having determined the maximum scores at the begin nodes, the paths which defined those scores are selected as the most likely connection between the words terminating at the end nodes and the following words beginning at the begin nodes. The search process is then continued in similar manner until the complete path through the lexical network is determined.

The ability to add words dynamically (i.e., concurrent with speech recognition) to the system vocabulary enables the system to use to advantage various constraints which are inherent in a domain-specific database, and thereby greatly facilitates recognition of speech input. For example, consider the case of an interactive sales-order system to which the present system may be applied. In such a database, the vocabulary includes, at least in part, records of associated fields containing elements of information pertinent to the user. During discourse with the user, the system prompts the user for various spoken inputs and, on recognizing the inputs, provides information or further prompts to the user in order to process an order. Because of the large number of elements (e.g., "customer names") that may need to be included in the vocabulary to be recognized, it may be impractical to have all potential elements of a field "active" (i.e., available for recognition) at one time. This problem is addressed in accordance with the present invention by using a related field in the record to limit the words which must be added to the active lexical network in order to perform the requisite spoken word recognition.

Figure 7:
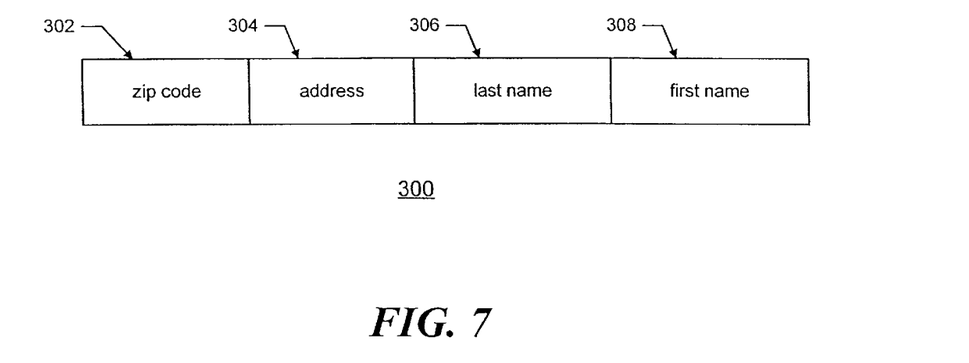

For example, as shown in FIG. 7, a record 300 may include a user's zip code, 302; his or her address, 304; the user's last name, 306; and the user's first name, 308. The fields 302, 304, 306, and 308 are related to or "associated with" each other in that they pertain to the same user. The zip code consists of a vocabulary of ten words (the ten digits). Furthermore, the number of users associated with a zip code, or several hypothesized zip codes is smaller than the total number of users. In accordance with the present invention, the user is first prompted for his or her zip code. The speech recognition system then determines the zip codes that are most likely to correspond to the actual zip code spoken by the user and adds to the lexical recognition network those last names corresponding to the zip codes so determined. This dramatically limits the number of names that must be added to the recognition network at a given time and therefore facilitates recognition of the last name. This capability is therefore expected to be widely useful.

What is claimed is:

1. A speech recognition system for dynamically adding words to an active portion of a total vocabulary, wherein interword relationships between pairs of words of the total vocabulary are defined by a lexical network, the speech recognition system comprising:

a plurality of nodes corresponding to interword relationships between adjacent words, the interword relationships being formed in accordance with a predefined congruence, wherein the nodes comprise:

A. a plurality of phonetic constraint nodes characterized by a phonetic constraint tuple (x, y, . . . ) of order two or greater, where x, y, . . . are phonetic constraints on adjacent words;

B. a plurality of connection nodes, wherein a set of phonetic constraint nodes corresponds to each connection node for identifying adjacent words from the active vocabulary satisfying the phonetic constraints of the set of phonetic constraint nodes; and C. a plurality of word class nodes each associated with a word class indicative of syntactic or semantic information of at least one word associated with each word class node, and each word class node being associated with a phonetic constraint nodes; and an apparatus configured to add a word to the active vocabulary portion of the total vocabulary, wherein the word to be added is selectively specified as a phonemic baseform pronunciation or a spelling and wherein the word has at least beginning and ending phonemes and a pre-associated word class, wherein the apparatus is configured to add the word by determining phonetic constraint nodes for the word corresponding to its phonemes and determining interword relationships for the word based on the connection nodes corresponding to the determined phonetic constraint nodes and based on the plurality of word class nodes and the pre-associated word class and by connecting a pronunciation network of the word to be added to at least one of the phonetic constraint nodes and the word class nodes.

2. The speech recognition system according to claim 1 in which said phonetic constraint tuples define at least a first phonetic constraint on a word and at least a second phonetic constraint on an adjacent word in a path through said lexical network.

3. The speech recognition system according to claim 1 wherein connection nodes corresponding to phonetic constraint nodes having corresponding word class nodes identify words from the active vocabulary corresponding to the phonetic constraints of the phonetic constraint nodes and the word classes of the corresponding word class nodes; and wherein, the apparatus configured to add the word configured to, if the word to be added to the active vocabulary has at least one word class, determine word class nodes corresponding to the word classes of the word to be added, and wherein the interword relationships for the word are determined by the connection nodes corresponding to the determined phonetic constraint nodes and word class nodes for word.

4. The speech recognition system according to claim 1 in which said phonetic constraint tuples define at least the last phoneme of a first word included in, or to be added to, the lexical network and the first phoneme of a second word included in, or to be added to, the lexical network in a path adjacent said first word.

5. The system of claim 1 wherein the apparatus configured to add the word is configured to associate the word with a word class node.

6. The system of claim 1 wherein the apparatus configured to add the word is configured to add a plurality of words to the active vocabulary each having at least beginning and ending phonemes and a pre-associated word class, wherein the apparatus is configured to add the words by determining phonetic constraint nodes for the words corresponding to their phonemes and determining interword relationships for the words based on the connection nodes corresponding to the determined phonetic constraint nodes and based on the plurality of word class nodes and the pre-associated word classes.

7. The system of claim 6 wherein the preassociated word classes are different.

8. A speech recognition system for dynamically augmenting an active vocabulary with a word from a total vocabulary, comprising:
  A. a lexical network comprising phonemic sequences defining words of the active vocabulary;
  B. constraint nodes defining constraints on permitted interconnection between selected phonemic sequences of words of the active vocabulary, the constraint nodes including phonetic constraint nodes defining phonetic constraints on adjacent words and word class nodes defining semantic or syntactic classes of words corresponding to the word class nodes, the word class nodes being associated with phonetic constraint nodes; and
  C. means for establishing links between pronunciation networks of words in the active vocabulary through said constraint nodes and for establishing a link between a first word, having a pre-associated word class, and a second word based on said word class nodes and said pre-associated word class, said first word being selected from a baseform pronunciation or a spelling portion of the total vocabulary and being an addition to the active vocabulary, wherein the link between the first word and the second word is formed by forming a pronunciation network for the first word and connecting at least one of beginning and ending phonemes of the pronunciation network of the first word to one of the word class nodes.

9. The speech recognition system according to claim 8 in which said phonetic constraints comprise segmental or suprasegmental phonetic constraints.

10. The speech recognition system according to claim 8 in which the phonetic constraint nodes are characterized by at least one phoneme from each of a pair of words and defining a permissible word-pair sequence.

11. The speech recognition system according to claim 10, wherein the constraint nodes further include connection nodes for connecting congruent phonetic constraint nodes.

12. A speech recognition system according to claim 11 in which the connection between said phonetic constraint nodes and said connection nodes are formed prior to speech recognition.

13. The speech recognition system according to claim 11, further comprising means for dynamically adding words to the recognition vocabulary by associating said words to phonetic constraint nodes.

14. The speech recognition system according to claim 8 in which a new word has begin and end nodes for linking the new word to constraint nodes.

15. A method for producing a word pronunciation network for a given word to augment a pre-established active vocabulary of a speech recognition vocabulary, wherein the given word is selected from a baseform pronunciation or spelling vocabularies of the speech recognition vocabulary, comprising:
  A. storing a set of phonemes for forming words of the speech recognition vocabulary;
  B. for each phoneme, storing a set of phonetic fragments formed in accordance with predetermined rules that define alternative pronunciations of the phoneme dependent on phonemes with which it may be connected;
  C. selecting and linking permissible phonetic fragments for each phoneme in the given word;
  D. associating the linked phonetic fragments with a word class, from a plurality of word classes, of the pre-established active vocabulary of the speech recognition vocabulary, the word class being indicative of semantic of syntactic information of the given word; and
  E. selectively associating the given word with at least one of the active vocabulary word classes based on the active vocabulary word classes and the associated word class.

16. The method of claim 15 in which phonetic fragments are indexed in storage by phoneme.

17. The method of claim 15 in which phonetic fragments are stored in the form of binary records that include fields defining permissible connection to other phonemes.

18. The method of claim 15 in which phonetic fragments are stored in the form of binary records that include fields defining permissible connections to preceding and succeeding phonemes.

19. The method of claim 15 in which a word pronunciation network is produced dynamically.

20. The method of claim 19 in which the phonetic fragments precompiled.

21. The method of claim 20 in which a phonetic fragment comprises one or more phones.

22. The method of claim 15 wherein each phonetic fragment has a begin node and an end node and each phoneme has a corresponding set of phonetic constraints, wherein the method further comprises precompiling associations between the set of phonetic constraints corresponding to a phoneme and the begin and the end nodes of the phonetic fragments for that phoneme.

23. The method of claim 22 in which at least one word class is associated with each vocabulary word and the method further comprises associating a set of word classes with each set of phonetic constraints.

24. The method of claim 22 further comprising joining the word pronunciation network for the given word to other words in a lexical network in accordance with the precompiled phonetic constraints associated with a first and a last phoneme in the given word.

25. The method of claim 23 further comprising joining the word pronunciation network for the given word to other words in a lexical network in accordance with the precompiled phonetic constraints associated with a first and a last phoneme in the given word and the at least one word class associated with the given word.

26. The method of claim 15 in which each phonetic fragment for a given phoneme includes labeled branches corresponding to permissible connections to adjacent phonemes, wherein a labeled branch connects only to a corresponding labeled branch of a phonetic fragment associated with an adjacent phoneme.

\* \* \* \* \*